United States Patent
Sawano et al.

(10) Patent No.: US 11,940,334 B2
(45) Date of Patent: Mar. 26, 2024

(54) POWER SUPPLY CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shunichi Sawano, Yokkaichi (JP); Masayuki Kato, Yokkaichi (JP); Shinnosuke Nakaguchi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 484 days.

(21) Appl. No.: 17/270,938

(22) PCT Filed: Aug. 23, 2019

(86) PCT No.: PCT/JP2019/033129
§ 371 (c)(1),
(2) Date: Feb. 24, 2021

(87) PCT Pub. No.: WO2020/045304
PCT Pub. Date: Mar. 5, 2020

(65) Prior Publication Data
US 2021/0325259 A1 Oct. 21, 2021

(30) Foreign Application Priority Data
Aug. 30, 2018 (JP) .................................. 2018-161491

(51) Int. Cl.
*G01K 7/16* (2006.01)
*H02H 5/04* (2006.01)
(Continued)

(52) U.S. Cl.
CPC ................. *G01K 7/16* (2013.01); *H02H 5/04* (2013.01); *H02H 7/228* (2013.01); *H02M 1/327* (2021.05)

(58) Field of Classification Search
CPC .......... G01K 7/16; H02H 7/228; H02M 3/156
See application file for complete search history.

(56) References Cited

U.S. PATENT DOCUMENTS

| | | | |
|---|---|---|---|
| 5,898,557 A * | 4/1999 | Baba ...................... | H03K 17/18 361/103 |
| 10,166,939 B2 * | 1/2019 | Nakamura ............... | G01K 7/42 |

(Continued)

FOREIGN PATENT DOCUMENTS

| | | |
|---|---|---|
| JP | 2004-328886 A | 11/2004 |
| JP | 2008-27826 A | 2/2008 |

(Continued)

OTHER PUBLICATIONS

International Search Report, Application No. PCT/JP2019/033129 dated Nov. 19, 2019. ISA/Japan Patent Office.

*Primary Examiner* — Kyle J Moody
(74) *Attorney, Agent, or Firm* — Honigman LLP

(57) ABSTRACT

In a power supply control device, a temperature calculation circuit calculates a wire temperature of a wire based on the current value of a current flowing through the wire. If the wire temperature calculated by the temperature calculation circuit is lower than a temperature threshold value, a drive unit switches on or off a switch in accordance with content indicated by a control signal output by a communication unit. When the wire temperature calculated by the temperature calculation circuit rises to the temperature threshold value or higher, the drive unit switches off the switch independently of content indicated by a control signal output by the communication unit.

5 Claims, 12 Drawing Sheets

(51) Int. Cl.
*H02H 7/22* (2006.01)
*H02M 1/32* (2007.01)

(56) References Cited

U.S. PATENT DOCUMENTS

| | | |
|---|---|---|
| 10,259,407 B2 | 4/2019 | Iwasaki et al. |
| 10,615,586 B2* | 4/2020 | Kozuki .................... H02H 3/08 |
| 10,951,020 B2* | 3/2021 | Sugisawa ............. H02H 1/0007 |
| 2009/0174976 A1 | 7/2009 | Saga et al. |
| 2012/0081825 A1* | 4/2012 | Nakamura ............. H02H 7/228 |
| | | 361/93.8 |
| 2012/0225328 A1 | 9/2012 | Nakanouchi et al. |
| 2015/0340854 A1 | 11/2015 | Richter et al. |
| 2018/0034259 A1 | 2/2018 | Sugisawa |
| 2019/0165564 A1* | 5/2019 | Fuseya .................. B60R 16/023 |

FOREIGN PATENT DOCUMENTS

| | | |
|---|---|---|
| JP | 2014-204575 A | 10/2014 |
| JP | 2015-105924 A | 6/2015 |

* cited by examiner

Legend
A= Communication circuit

Wire temperature table    71

| Load ID | A | B | Flag |
|---------|---|---|------|
| E01 | ... | ... | 0 |
| E02 | ... | ... | 0 |
| E03 | ... | ... | 1 |
| ⋮ | ⋮ | ⋮ | ⋮ |

Legend
A= Former temperature difference
B= Wire temperature

POWER SUPPLY CONTROL DEVICE

CROSS-REFERENCE TO RELATED APPLICATIONS

This application is the U.S. national stage of PCT/JP2019/033129 filed on Aug. 23, 2019, which claims priority of Japanese Patent Application No. JP 2018-161491 filed on Aug. 30, 2018, the contents of which are incorporated herein.

TECHNICAL FIELD

The present disclosure relates to a power supply control device.

BACKGROUND

JP 2016-43872A discloses a power supply control device for vehicles that controls power supply from a power source to a load. In this power supply control device, a switch is provided between the power source and the load. Power supply to the load is controlled by switching on or off the switch.

In a conventional power supply control device such as that described in JP 2016-43872A, a switch is provided on a wire connected to a load. When the switch is switched on, a current flows through the wire. The wire has a resistance component, and thus, when a current flows through the wire, the wire temperature rises. When the wire temperature changes to an abnormal temperature, the properties of the wire deteriorate. Thus, it is necessary to switch off the switch before the wire temperature changes to an abnormal temperature, and protect the wire from an abnormal temperature.

In view of this, an object of the present disclosure is to provide a power supply control device that can protect a wire from an abnormal temperature.

SUMMARY

A power supply control device according to one aspect of the present disclosure is a power supply control device that includes a switching unit that switches on or off a switch disposed on a wire, and the power supply control device includes an output unit that outputs a control signal indicating whether the switch is to be on or off, and a temperature calculation unit that calculates a wire temperature of the wire based on a current value of a current flowing through the wire, and, if the wire temperature calculated by the temperature calculation unit is lower than a temperature threshold value, the switching unit switches on or off the switch in accordance with content indicated by the control signal output by the output unit, and, if the wire temperature calculated by the temperature calculation unit is higher than or equal to the temperature threshold value, the switching unit switches off the switch independently of the content indicated by the control signal output by the output unit.

Advantageous Effects of Disclosure

According to the present disclosure, it is possible to protect a wire from an abnormal temperature.

DETAILED DESCRIPTION OF PREFERRED EMBODIMENTS

Figure 1:
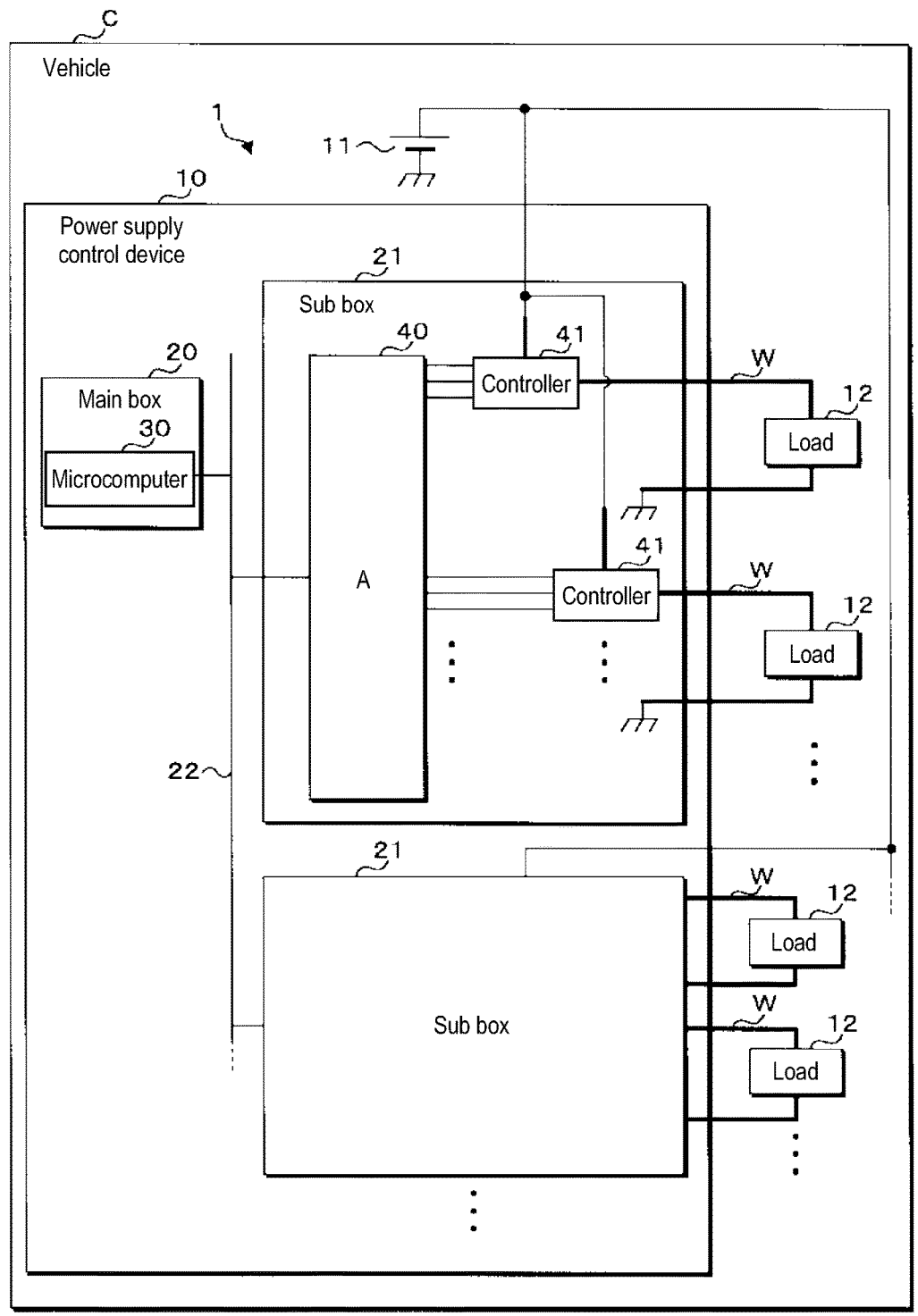
FIG. 1 is a block diagram showing the main constituent elements of a power source system according to a first embodiment.

First, embodiments of the present disclosure will be listed and described. At least some of the embodiments to be described below may be suitably combined.

A power supply control device according to one aspect of the present disclosure is a power supply control device that includes a switching unit that switches on or off a switch disposed on a wire, and the power supply control device includes an output unit that outputs a control signal indicating whether the switch is to be on or off, and a temperature calculation unit that calculates a wire temperature of the wire based on a current value of a current flowing through the wire, and, if the wire temperature calculated by the temperature calculation unit is lower than a temperature threshold value, the switching unit switches on or off the switch in accordance with content indicated by the control signal output by the output unit, and if the wire temperature calculated by the temperature calculation unit is higher than or equal to the temperature threshold value, the switching unit switches off the switch independently of the content indicated by the control signal output by the output unit.

In the above aspect, when the wire temperature calculated based on the current value of a current flowing through the wire rises to the temperature threshold value or higher, the switch is switched off independently of the control signal. Thus, the wire temperature does not exceed the temperature threshold value, and the wire is protected from an abnormal temperature.

The power supply control device according to one aspect of the present disclosure includes an on-determination unit that determines whether or not to switch on the switch, an off-determination unit that determines whether or not to switch off the switch, and a second temperature calculation unit that calculates the wire temperature based on the current value, and, if the wire temperature calculated by the second temperature calculation unit is lower than a second temperature threshold value, the output unit outputs a control signal indicating content that is based on a determination result by the on-determination unit or off-determination unit, and, when the wire temperature calculated by the second temperature calculation unit rises to the second temperature threshold value or higher, the output unit outputs a control signal indicating that the switch is to be off independently of the determination result.

In the above aspect, when the wire temperature calculated based on the current value of a current flowing through the wire rises to the second temperature threshold value or higher, a control signal indicating that the switch is to be switched off is output. Assume that, due to an occurrence of a malfunction, a configuration in which the switch is switched on or off in accordance with a control signal despite the wire temperature having risen to the temperature threshold value or higher is maintained. Even in this case, when the wire temperature rises to the second temperature threshold value or higher, a control signal indicating the switch is to be switched off is output.

In addition, assume that content indicated by a control signal is fixed to content indicating that the switch is to be on due to an occurrence of a malfunction. Even in this case, when the wire temperature rises to the temperature threshold value or higher, the switch is switched off independently of the control signal.

Accordingly, even if a malfunction occurs, the wire is protected from an abnormal temperature.

In the power supply control device according to one aspect of the present disclosure, the temperature calculation unit and the second temperature calculation unit each repeatedly calculate a temperature difference between an environmental temperature in a vehicle and the wire temperature, and the temperature calculation unit and the second temperature calculation unit each calculate a temperature difference based on a formerly calculated temperature difference and the current value, and calculate the wire temperature by adding the environmental temperature to the calculated temperature difference.

In the above aspect, in two calculations for a wire temperature, the temperature difference between the wire temperature and the environmental temperature in the vehicle is calculated based on a formerly calculated temperature difference and the current value of a current flowing through the wire. The wire temperature is calculated by adding the environmental temperature to the calculated temperature difference.

The power supply control device according to one aspect of the present disclosure includes a temperature difference determination unit that determines whether or not two temperature differences calculated by the temperature calculation unit and the second temperature calculation unit are different from each other, and, if the temperature difference determination unit determines that the two temperature differences are different from each other, the temperature calculation unit and second temperature calculation unit use a larger temperature difference out of the two temperature differences as the former temperature difference.

In the above aspect, in two calculations for a wire temperature, if two calculated temperature differences are different from each other, the former temperature differences are set to the larger temperature difference out of the two temperature differences. Thus, two temperature differences that are calculated hardly differ. Furthermore, since the former temperature differences are set to the larger temperature difference, it is unlikely that the calculated wire temperature will be lower than the actual wire temperature.

The power supply control device according to one aspect of the present disclosure includes a temperature determination unit that determines whether or not a second difference value between two wire temperatures calculated by the temperature calculation unit and the second temperature calculation unit is larger than or equal to a second predetermined value.

In the above aspect, a determination is performed on whether or not an abnormality has occurred in calculation of a wire temperature by determining whether or not the second difference value between two calculated wire temperatures is larger than or equal to the second predetermined value.

Specific examples of a power source system according to embodiments of the present disclosure will be described below with reference to the drawings. Note that the present disclosure is not limited to illustrations of these, but is indicated by the claims, and all changes that come within the meaning and range of equivalency of the claims are intended to be embraced therein.

First Embodiment

FIG. 1 is a block diagram showing the main constituent elements of a power source system 1 according to a first embodiment. The power source system 1 is mounted in a vehicle C. The power source system 1 includes a power supply control device 10, a battery 11, and a plurality of loads 12. The positive electrode of the battery 11 is connected to the power supply control device 10. The negative electrode of the battery 11 is grounded. The two ends of each of a plurality of wires W are connected to the power supply control device 10. The loads 12 are respectively disposed on the wires W. The power supply control device 10 individually controls power supply from the battery 11 to the plurality of loads 12. The loads 12 are electric apparatuses mounted in the vehicle C.

The power supply control device 10 includes a main box 20, a plurality of sub boxes 21, and a communication bus 22. A microcomputer 30 is housed in the main box 20. The configurations of the plurality of sub boxes 21 are similar. A communication circuit 40 and a plurality of controllers 41 are housed in each of the sub boxes 21.

The main box 20 and the plurality of sub boxes 21 are connected to the communication bus 22. Specifically, the microcomputer 30 of the main box 20 and the communication circuits 40 of the respective sub boxes 21 are connected to the communication bus 22.

In each of the sub boxes 21, a plurality of controllers 41 are connected to the communication circuit 40. One end of each of a plurality of wires W is connected to the positive electrode of the battery 11, and the other end is grounded. Controllers 41 are disposed on the respective wires W. Therefore, loads 12 and the controllers 41 are disposed on the respective wires W. The plurality of loads 12 that are connected to the power supply control device 10 are arranged at various locations in the vehicle C. The plurality of sub boxes 21 are also arranged at various locations in the vehicle C according to the arrangement locations of the plurality of loads 12.

The battery 11 supplies power to the loads 12 via the controllers 41. As will be described latter, each of the controllers 41 includes a switch 50 (see FIG. 2) connected between the battery 11 and the load 12. In each of the sub boxes 21, the communication circuit 40 outputs a control signal indicating whether the switch 50 is to be on or off, to the plurality of controllers 41. Each of the controllers 41 switches on or off the switch 50 in accordance with the content indicated by the control signal input from the communication circuit 40.

When the switch 50 is switched on, power supply from the battery 11 to the load 12 is started. When the switch 50 is switched off, power supply from the battery 11 to the load 12 ends.

The microcomputer 30 transmits a power supply start signal instructing power supply start and a power supply end signal instructing power supply end, to the plurality of communication circuits 40 housed in the plurality of sub boxes 21 via the communication bus 22.

Load IDs (Identification Data) are respectively allocated to the plurality of loads 12 connected to the power supply control device 10. The power supply start signal and power supply end signal each include a load ID. The power supply start signal and power supply end signal are signals instructing start or stop of power supply to the load 12 corresponding to the load ID included therein.

Communication that is performed via the communication bus 22 is communication that complies with the protocol of CAN (controller area network), Ethernet (registered trademark), or the like. Each communication circuit 40 corresponds to a plurality of loads 12 connected to the sub box 21 in which the communication circuit 40 is housed. The communication circuit 40 of each sub box 21 stores load IDs of the plurality of loads 12 corresponding to the communication circuit 40.

When the power supply start signal is received, the communication circuit 40 outputs a control signal indicating that the switch 50 is to be on, to the controller 41 connected to the load 12 corresponding to the load ID included in the power supply start signal. Accordingly, the controller 41 switches on the switch 50, and power supply to the load 12 corresponding to the load ID included in the power supply start signal is started.

Similarly, when the power supply end signal is received, the communication circuit 40 outputs a control signal indicating that the switch 50 is to be off, to the controller 41 connected to the load 12 corresponding to the load ID included in the power supply end signal. Accordingly, the controller 41 switches off the switch 50, and power supply to the load 12 corresponding to the load ID included in the power supply end signal ends. The communication circuit 40 functions as an output unit.

Each controller 41 repeatedly calculates a wire temperature of the wire W on which the controller 41 is disposed, based on the current value of a current flowing through the wire W. Hereinafter, the current value of a current flowing through a wire W is referred to as "wire current value". When the calculated wire temperature is higher than or equal to a first temperature threshold value, the controller 41 switches off the switch 50 independently of a voltage indicated by a control signal input from the communication circuit 40, and forcefully ends power supply via the wire W. The first temperature threshold value is a fixed value, and is set in advance.

Current information indicating the wire current value of the wire W and temperature information indicating the environmental temperature in the vehicle C are input from each of the plurality of controllers 41 to the communication circuit 40. The communication circuit 40 transmits, to the microcomputer 30, an information signal that includes the input current information and temperature information. The microcomputer 30 calculates a wire temperature of the wire W based on the wire current value and the environmental temperature respectively indicated by the current information and temperature information included in the information signal received from the communication circuit 40. When a calculated wire temperature is higher than or equal to a second temperature threshold value, the microcomputer 30 transmits the power supply end signal, and ends power supply to the load 12 in which the wire temperature is higher than or equal to the second temperature threshold value. The second temperature threshold value is a fixed value, and is set in advance. The first temperature threshold value and second temperature threshold value are preferably the same.

Figure 2:
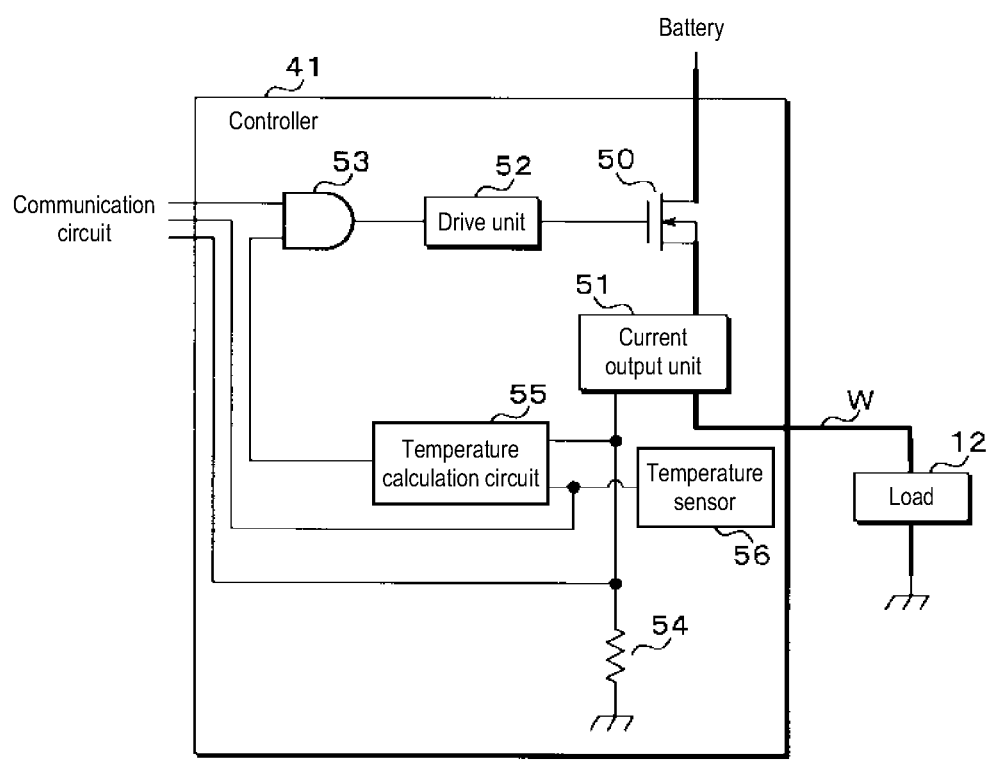
FIG. 2 is a block diagram showing the main constituent elements of a controller.

FIG. 2 is a block diagram showing the main constituent elements of a controller 41. The configurations of the plurality of controllers 41 included in the power supply control device 10 are similar. Each controller 41 includes a current output unit 51, a drive unit 52, an AND circuit 53, a resistor 54, a temperature calculation circuit 55, and a temperature sensor 56, in addition to the switch 50. The switch 50 is an N-channel FET (field effect transistor). The AND circuit 53 includes two input ends and one output end.

The switch 50 and the current output unit 51 are disposed on the wire W. The current output unit 51 is disposed between the switch 50 and the load 12. The drain of the switch 50 is connected to the positive electrode of the battery 11. The source of the switch 50 is connected to the current output unit 51. The gate of the switch 50 is connected to the drive unit 52. The drive unit 52 is further connected to the output end of the AND circuit 53.

The current output unit 51 is further connected to one end of the resistor 54. The other end of the resistor 54 is grounded. Connection nodes between the current output unit 51 and the resistor 54 are connected to the communication circuit 40 and the temperature calculation circuit 55. An output end of the temperature sensor 56 is also connected to the communication circuit 40 and the temperature calculation circuit 55. The communication circuit 40 and the temperature calculation circuit 55 are respectively connected to the two input ends of the AND circuit 53.

The communication circuit 40 outputs a control signal to one of the input ends of the AND circuit 53. The control signal is constituted by a high-level voltage and a low-level voltage. Regarding the control signal, the high-level voltage corresponds to content indicating that the switch 50 is to be on, and the low-level voltage corresponds to content indicating that the switch 50 is to be off. The temperature calculation circuit 55 outputs the high-level voltage and the low-level voltage to the other input end of the AND circuit 53.

When the temperature calculation circuit 55 is outputting the high-level voltage, the AND circuit 53 outputs a voltage indicated by the control signal input from the communication circuit 40, to the drive unit 52. Therefore, when the control signal indicates the high-level voltage, in other words the control signal indicates that the switch 50 is to be on, the AND circuit 53 outputs the high-level voltage to the drive unit 52. When the control signal indicates the low-level voltage, in other words the control signal indicates that the switch 50 is to be off, the AND circuit 53 outputs the low-level voltage to the drive unit 52.

When the temperature calculation circuit 55 outputs the low-level voltage, the AND circuit 53 outputs the low-level voltage to the drive unit 52, independently of the voltage indicated by the control signal.

When the voltage of the gate of the switch 50 with respect to the potential of the source is higher than or equal to a certain voltage, a current can flow via the drain and source. As a result, the switch 50 is switched on. When the voltage of the gate of the switch 50 with respect to the potential of the source is lower than the certain voltage, no current flows via the drain and source. As a result, the switch 50 is switched off.

When the voltage that is output by the AND circuit 53 switches from the low-level voltage to the high-level voltage, the drive unit 52 increases the voltage of the gate of the switch 50 with respect to the ground potential. Accordingly, the voltage of the gate of the switch 50 with respect to the potential of the source rises to the certain voltage or higher, and the switch 50 is switched on. When the switch 50 is switched on, a current flows from the positive electrode of the battery 11 to the switch 50, the current output unit 51, and the load 12 in that order, and power supply from the battery 11 to the load 12 is started.

When the voltage that is output by the AND circuit 53 switches from the high-level voltage to the low-level voltage, the drive unit 52 decreases the voltage of the gate of the switch 50 with respect to the ground potential. Accordingly, the voltage of the gate of the switch 50 with respect to the potential of the source drops below the certain voltage, and the switch 50 is switched off. When the switch 50 is switched off, power supply from the battery 11 to the load 12 ends as described above. The drive unit 52 functions as a switching unit.

The current output unit 51 outputs, to the resistor 54, a current whose current value is a fraction of a predetermined number of the wire current value. The current output unit 51 is constituted by a current mirror circuit, for example. The predetermined number is 4000, for example. The voltage value between the two ends of the resistor 54 (hereinafter, referred to as "end-to-end voltage value of the resistor 54") is input as analog current information to the communication circuit 40 and the temperature calculation circuit 55. In the communication circuit 40 and the temperature calculation circuit 55, the input analog current information is converted into digital current information.

The wire current value, the predetermined number, the resistance value of the resistor 54, and the end-to-end voltage value of the resistor 54 are respectively indicated by Iw, N, R, and Vh. In this case, the following equation holds.

$$Vh = Iw \cdot R/N$$

Here, "·" denotes multiplication.

Therefore, the wire current value Iw is expressed as (N·Vh/R). The resistance value R is a constant. Thus, the wire current value Iw can be calculated using the end-to-end voltage value Vh of the resistor 54, and the end-to-end voltage value Vh of the resistor 54 is current information indicating the wire current value Iw.

The temperature sensor 56 is constituted by a thermistor, for example, and detects the environmental temperature in the vehicle C. The environmental temperature in the vehicle C is the ambient temperature around the wires W, for example. The temperature sensor 56 outputs analog temperature information indicating the detected environmental temperature to the communication circuit 40 and the temperature calculation circuit 55. The temperature information is a voltage value that changes according to the environmental temperature in the vehicle C, for example. In the communication circuit 40 and the temperature calculation circuit 55, the analog temperature information input from the temperature sensor 56 is converted into digital temperature information.

The communication circuit 40 and the temperature calculation circuit 55 periodically obtain digital current information and temperature information. Every time the communication circuit 40 obtains current information and temperature information, the communication circuit 40 transmits an information signal that includes the current information and temperature information to the microcomputer 30.

The temperature calculation circuit 55 does not include a processing element such as a CPU (Central Processing Unit), but includes a plurality of circuit elements such as AND circuits, OR circuits, or flip flop circuits. The temperature calculation circuit 55 is constituted by hardware. Every time current information and temperature information are obtained, the temperature calculation circuit 55 calculates the temperature difference between the environmental temperature and the wire temperature based on the wire current value and the environmental temperature respectively indicated by the obtained current information and temperature information. The temperature calculation circuit 55 calculates the wire temperature by adding the calculated temperature difference to the environmental temperature in the vehicle C. The temperature calculation circuit 55 functions as a temperature calculation unit.

A temperature difference to be calculated, a formerly calculated temperature difference, and the environmental temperature in the vehicle C are respectively indicated by ΔTw, ΔTp, and Ta. The temperature calculation circuit 55 calculates the temperature difference ΔTw by substituting the previously calculated former temperature difference ΔTp, the wire current value Iw, and the environmental temperature Ta in Expressions 1 and 2 below.

$$\Delta Tw = \Delta Tp \cdot exp(-\Delta t/\tau r) + Rth \cdot Rw \cdot Iw^2 \cdot (1 - exp(-\Delta t/\tau r)) \quad (1)$$

$$Rw = Ro \times (1 + \kappa \cdot (Ta + \Delta Tp - To)) \quad (2)$$

Variables and constants used in Expressions 1 and 2 will be described. In the description of the variables and constants, units of the variables and constants are also described. As described above, ΔTw, ΔTp, Ta, and Iw respectively indicate a temperature difference (° C.) to be calculated, a former temperature difference (° C.), the environmental temperature in the vehicle C (° C.), and a wire current value (A). Rw indicates the wire resistance value (Ω) of a wire W. Rth indicates the wire heat resistance value (° C./W) of a wire W. Δt indicates a period (s) at which the temperature calculation circuit 55 obtains current information and temperature information. τr indicates the wire heat dissipation time constant (s) of a wire W. To indicates a predetermined temperature (° C.). Ro indicates the wire resistance (Ω) at the temperature To. κ indicates the wire resistance temperature coefficient (/° C.) of a wire W.

The temperature difference ΔTw, the former temperature difference ΔTp, the wire current value Iw, and the environmental temperature Ta are variables, and the period Δt, the wire heat dissipation time constant τr, the wire heat resistance Rth, the wire resistance Ro, the wire resistance temperature coefficient κ, and the temperature To are preset constants.

The longer the period Δt is, the smaller the value of the first term in Expression 1 becomes, and thus the first term in Expression 1 indicates heat dissipation from the wire W. In addition, the longer the period Δt is, the larger the value of the second term in Expression 1 becomes, and thus the second term in Expression 1 indicates heat generation in the wire W. The larger the wire current value Iw is, the larger the value of the second term becomes.

The temperature calculation circuit 55 calculates the wire temperature of the wire W by adding the environmental temperature Ta detected by the temperature sensor 56, to the calculated temperature difference ΔTw. In calculation of the temperature difference ΔTw that is first executed by the temperature calculation circuit 55 after power supply to the temperature calculation circuit 55 is started, the wire temperature is assumed to be the same as the environmental temperature Ta, and ΔTp is regarded as zero. Power supply to the temperature calculation circuit 55 is started, for example, when the ignition switch of the vehicle C is switched on.

If the calculated wire temperature is lower than the first temperature threshold value, the temperature calculation circuit 55 outputs the high-level voltage to the AND circuit 53. The first temperature threshold value is a certain value, and is set in advance. When the calculated wire temperature rises to the first temperature threshold value or higher, the temperature calculation circuit 55 outputs the low-level voltage to the AND circuit 53. Thereafter, the temperature calculation circuit 55 continuously outputs the low-level voltage to the AND circuit 53, independently of the calculated wire temperature.

Figure 3:
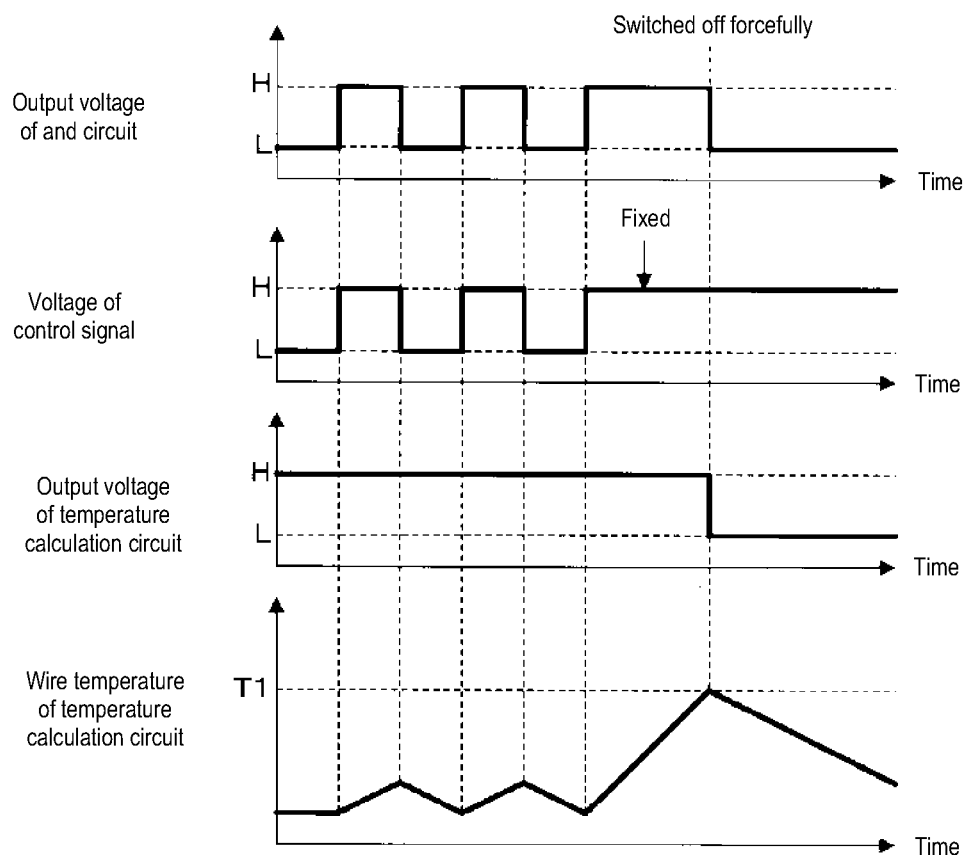
FIG. 3 is a diagram illustrating operations of the controller.

FIG. 3 is a diagram illustrating operations of a controller 41. FIG. 3 shows an output voltage of the AND circuit 53, a voltage indicated by a control signal, an output voltage of the temperature calculation circuit 55, and a wire temperature calculated by the temperature calculation circuit 55. In these graphs, the horizontal axis indicates time. In FIG. 3, the high-level voltage and the low-level voltage are respectively indicated by "H" and "L". The first temperature threshold value is indicated by T1.

If the calculated wire temperature is lower than the first temperature threshold value T1, the temperature calculation circuit 55 outputs the high-level voltage to the AND circuit 53. In this case, the AND circuit 53 outputs the voltage indicated by the control signal. Therefore, while the temperature calculation circuit 55 is outputting the high-level voltage, the output voltage of the AND circuit 53 is the same as the voltage indicated by the control signal. Therefore, when the temperature calculation circuit 55 outputs the high-level voltage, the drive unit 52 switches on or off the switch 50 in accordance with the voltage indicated by the control signal.

Assume that the voltage indicated by the control signal is fixed at the high-level voltage due to various causes. In this case, as long as the wire temperature calculated by the temperature calculation circuit 55 is lower than the first temperature threshold value T1, the drive unit 52 keeps the switch 50 in the on state. When the voltage indicated by the control signal is fixed at the high-level voltage, and the wire temperature calculated by the temperature calculation circuit 55 rises to the first temperature threshold value T1 or higher, the temperature calculation circuit 55 switches the voltage that is output to the AND circuit 53 from the high-level voltage to the low-level voltage.

Accordingly, the voltage that is output by the AND circuit 53 switches from the high-level voltage to the low-level voltage independently of the voltage indicated by the control signal, and the drive unit 52 switches the switch 50 from on to off. As described above, after the calculated wire temperature has risen to the first temperature threshold value T1 or higher, the temperature calculation circuit 55 continuously outputs the low-level voltage independently of the calculated wire temperature. Thus, the drive unit 52 keeps the switch 50 in the off state. When the switch 50 is off, no current flows through the wire W, and thus the wire temperature drops with the lapse of time.

As described above, the microcomputer 30 also calculates a wire temperature. As will be described later, when the wire temperature calculated by the microcomputer 30 rises to the second temperature threshold value or higher, the voltage indicated by the control signal switches to the low-level voltage. Thus, at a timing that is substantially the same as a timing when the output voltage of the temperature calculation circuit 55 switches to the low-level voltage, the voltage indicated by the control signal also switches to the low-level voltage if the voltage indicated by the control signal is not fixed to the high-level voltage.

As described above, when the wire temperature calculated by the temperature calculation circuit 55 rises to the first temperature threshold value T1 or higher, the drive unit 52 switches off the switch 50 independently of the control signal. Thus, the wire temperature does not exceed the first temperature threshold value, and the wire W is protected from an abnormal temperature.

Figures 4, 5:
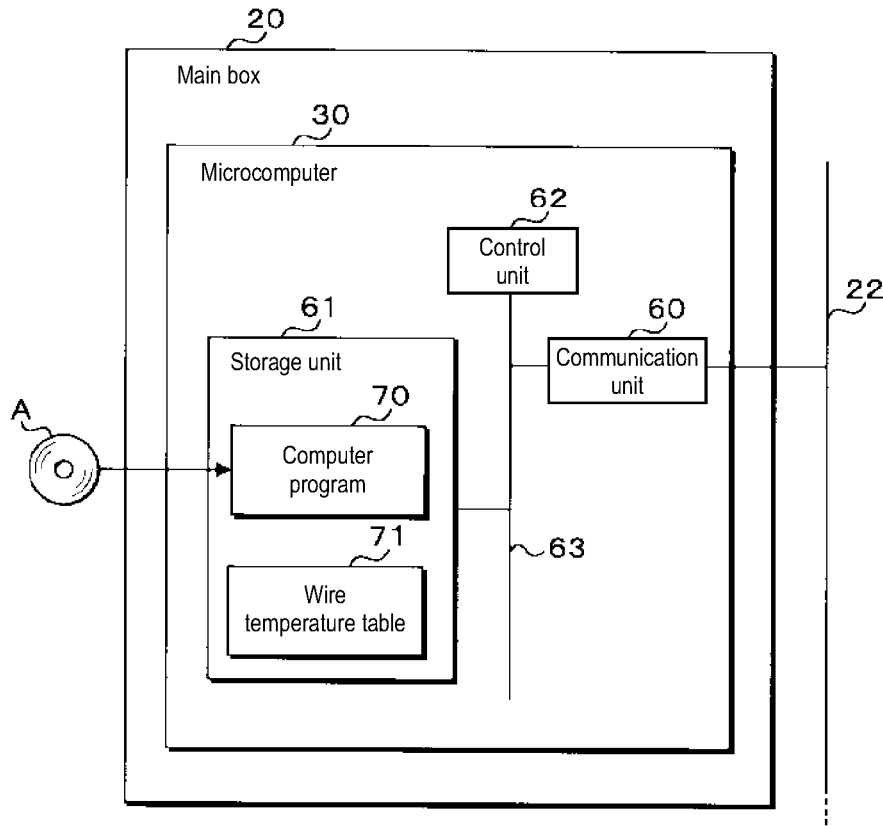
FIG. 4 is a block diagram showing the main constituent elements of a microcomputer.
FIG. 5 is a table diagram showing a wire temperature table.

FIG. 4 is a block diagram showing the main constituent elements of the microcomputer 30. The microcomputer 30 includes a communication unit 60, a storage unit 61, and a control unit 62. These units are connected to an internal bus 63. The communication unit 60 is connected to the communication bus 22 in addition to the internal bus 63.

The communication unit 60 transmits the power supply start signal and power supply end signal to a plurality of communication circuits 40 in accordance with an instruction from the control unit 62. The communication unit 60 receives information signals from the plurality of communication circuits 40. The current information and temperature information indicated by the information signals received by the communication unit 60 are obtained by the control unit 62.

The storage unit 61 is a non-volatile memory. A computer program 70 and a wire temperature table 71 are stored in the storage unit 61. The control unit 62 includes a processing element that executes processing. The processing element is a CPU, for example. The processing element (computer) of the control unit 62 executes power supply control processing for controlling power supply to the loads 12 and wire protection processing for protecting the wires W from an abnormal temperature by executing the computer program 70. Note that the number of processing elements of the control unit 62 may also be two or more. In this case, a plurality of processing elements may also execute power supply control processing or wire protection processing in cooperation.

The processing element of the control unit 62 executes power supply control processing for each of the plurality of loads 12 connected to the power supply control device 10. Furthermore, the processing element of the control unit 62 executes wire protection processing for each of the plurality of wires W on which the plurality of loads 12 connected to the power supply control device 10 are disposed. The computer program 70 is used for causing the processing element of the control unit 62 to execute power supply control processing and wire protection processing.

Note that the computer program 70 may also be stored in a storage medium A in a manner readable by the processing element of the control unit 62. In this case, the computer program 70 read out from the storage medium A by a readout device (not illustrated) is stored in the storage unit 61. The storage medium A is an optical disk, a flexible disk, a magnetic disk, a magnetic optical disk, a semiconductor memory, or the like. The optical disk is a CD (compact disk)-ROM (read only memory), a DVD (digital versatile disk)-ROM, a BD (Blu-ray (registered trademark) disk), or the like. The magnetic disk is a hard disk, for example. In addition, the computer program 70 may also be downloaded from an external device (not illustrated) connected to a communication network (not illustrated), and stored in the storage unit 61.

FIG. 5 is a table diagram showing the wire temperature table 71. The wire temperature table 71 includes a load ID field, a former temperature difference field, and a wire temperature field. A plurality of load IDs are stored in the load ID field. In the load ID field, "E01", "E02", "E03", and the like are stored as load IDs.

The former temperature differences of the plurality of wires W corresponding to the plurality of load IDs stored in the load ID field are stored in the former temperature difference field. The wire W corresponding to each load ID is the wire W on which the load 12 corresponding to the load ID is disposed. The wire temperatures of the plurality of wires W corresponding to the respective load IDs stored in the load ID field are stored in the wire temperature field.

The value of a flag corresponding to each of the plurality of load IDs stored in the load ID field is stored in a flag field. The value of the flag is 0 or 1. The value of the flag being zero indicates that the wire temperature is lower than the second temperature threshold value. The value of the flag being 1 indicates that the wire temperature has risen to the second temperature threshold value or higher. The former temperature difference, the wire temperature, and the value of the flag of each load ID are updated by the control unit 62.

Figure 6:
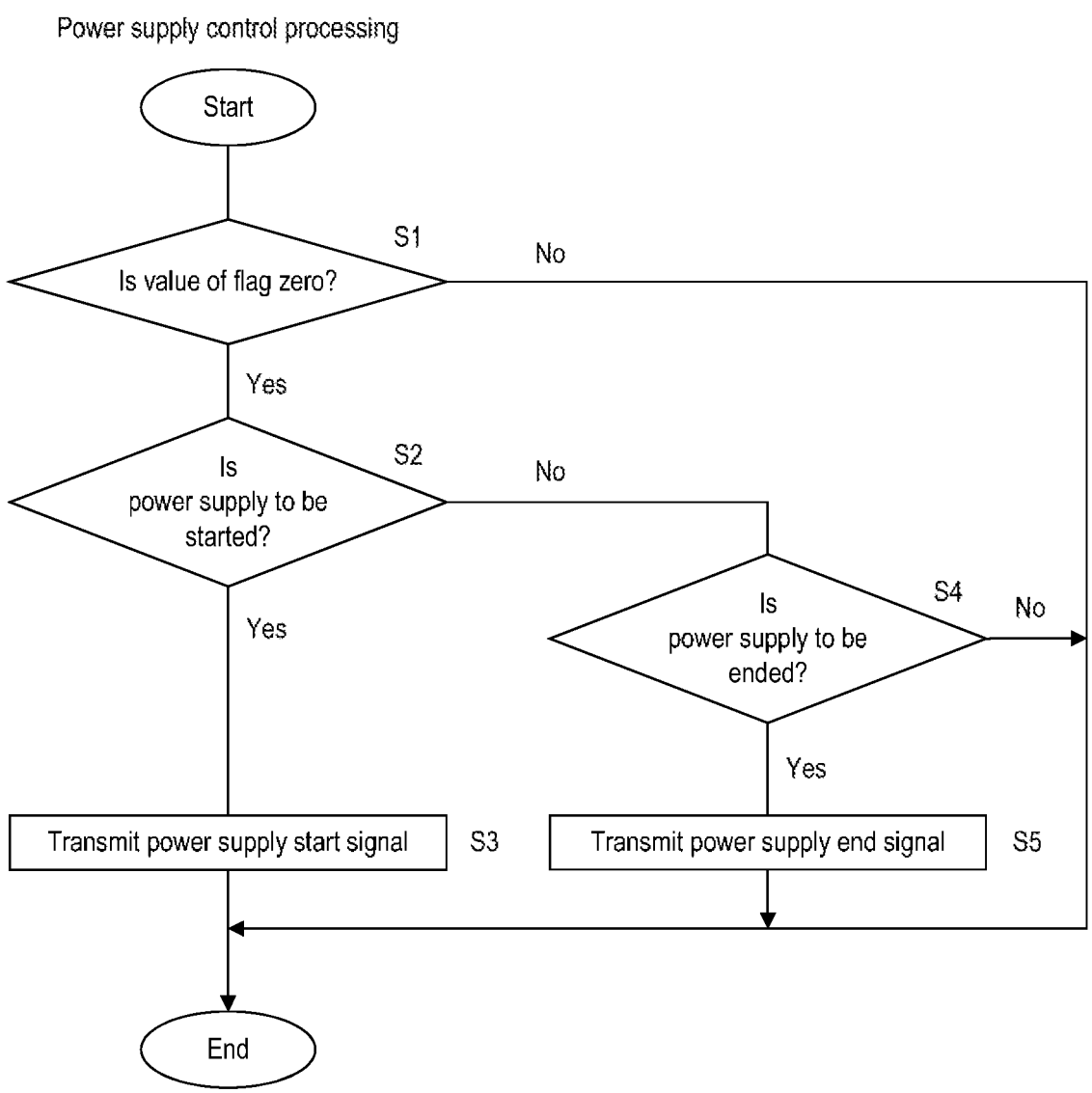
FIG. 6 is a flowchart showing the procedure of power supply control processing.

FIG. 6 is a flowchart showing the procedure of power supply control processing. Here, power supply control processing of the load 12 whose load ID is "E01" will be described. Power supply control processing of the load 12 corresponding to another load ID is executed similarly to the power supply control processing of the load 12 whose load ID is "E01".

The control unit 62 periodically executes the power supply control processing. First, the control unit 62 determines whether or not the value of the flag corresponding to a load ID, namely "E01" is zero, based on the wire temperature table 71 (step S1). If it is determined that the value of the flag is zero (step S1: YES), the control unit 62 determines whether or not to start power supply to the load 12 corresponding to "E01" (step S2).

In step S2, the control unit 62 makes a determination to start power supply, for example, when a power supply start instruction instructing that power supply to the load 12 corresponding to "E01" be started is input to an input unit (not illustrated). In this case, if a power supply start instruction for the load 12 corresponding to "E01" has not been input to the input unit, the control unit 62 makes a determination to not start power supply.

As described above, power supply to the load 12 is started as a result of switching on the switch 50 connected to the load 12. Therefore, the determination in step S2 corresponds to determination as to whether or not to switch on the switch 50. The control unit 62 functions as an on-determination unit.

If a determination is made to start power supply (step S2: YES), the control unit 62 instructs the communication unit 60 to transmit a power supply start signal in which the load ID is "E01" to the communication circuit 40 of the sub box 21 connected to the load 12 corresponding to "E01" (step S3). Accordingly, the communication circuit 40 outputs a control signal indicating that the switch 50 is to be on, namely the high-level voltage, to the AND circuit 53 of controller 41 that controls power supply to the load 12 corresponding to "E01". Here, if the wire temperature calculated by the temperature calculation circuit 55 is lower than the first temperature threshold value, the drive unit 52 switches on the switch 50. Accordingly, power supply to the load 12 corresponding to "E01" is started.

If a determination is made to not start power supply (step S2: NO), the control unit 62 determines whether or not to end power supply to the load 12 corresponding to "E01" (step S4). In step S4, for example, when a power supply end instruction instructing that power supply to the load 12 corresponding to "E01" be ended is input to the input unit (not illustrated), the control unit 62 makes a determination to end power supply. In this case, if a power supply end instruction for the load 12 corresponding to "E01" has not been input to the input unit, the control unit 62 makes a determination to not end power supply.

As described above, power supply to the load 12 is ended as a result of switching off the switch 50 connected to the load 12. Therefore, the determination in step S4 corresponds to determination as to whether or not to switch off the switch 50. The control unit 62 also functions as an off-determination unit.

If a determination is made to end power supply (step S4: YES), the control unit 62 instructs the communication unit 60 to transmit a power supply end signal in which the load ID is "E01" to the communication circuit 40 connected to the load 12 corresponding to "E01" (step S5). Accordingly, the communication circuit 40 outputs a control signal indicating that the switch 50 is to be off, namely the low-level voltage, to the AND circuit 53 of the controller 41 that controls power supply to the load 12 corresponding to "E01". Accordingly, the drive unit 52 switches off the switch 50, and power supply to the load 12 corresponding to "E01" ends.

If it is determined that the value of the flag is not zero (step S1: NO), if a determination is made to not end power supply (step S4: NO), or after one of steps S3 and S5 is executed, the control unit 62 ends the power supply control processing.

In the power supply control processing, when the value of the flag is zero, power supply to the load 12 corresponding to "E01" is controlled. As will be described later, the value of the flag is set to 1 when the switch 50 is off. Thus, when the value of the flag is 1, power supply to the load 12 corresponding to "E01" is not controlled, and the switch 50 connected to the load 12 corresponding to "E01" is kept in the off state.

Figure 7:
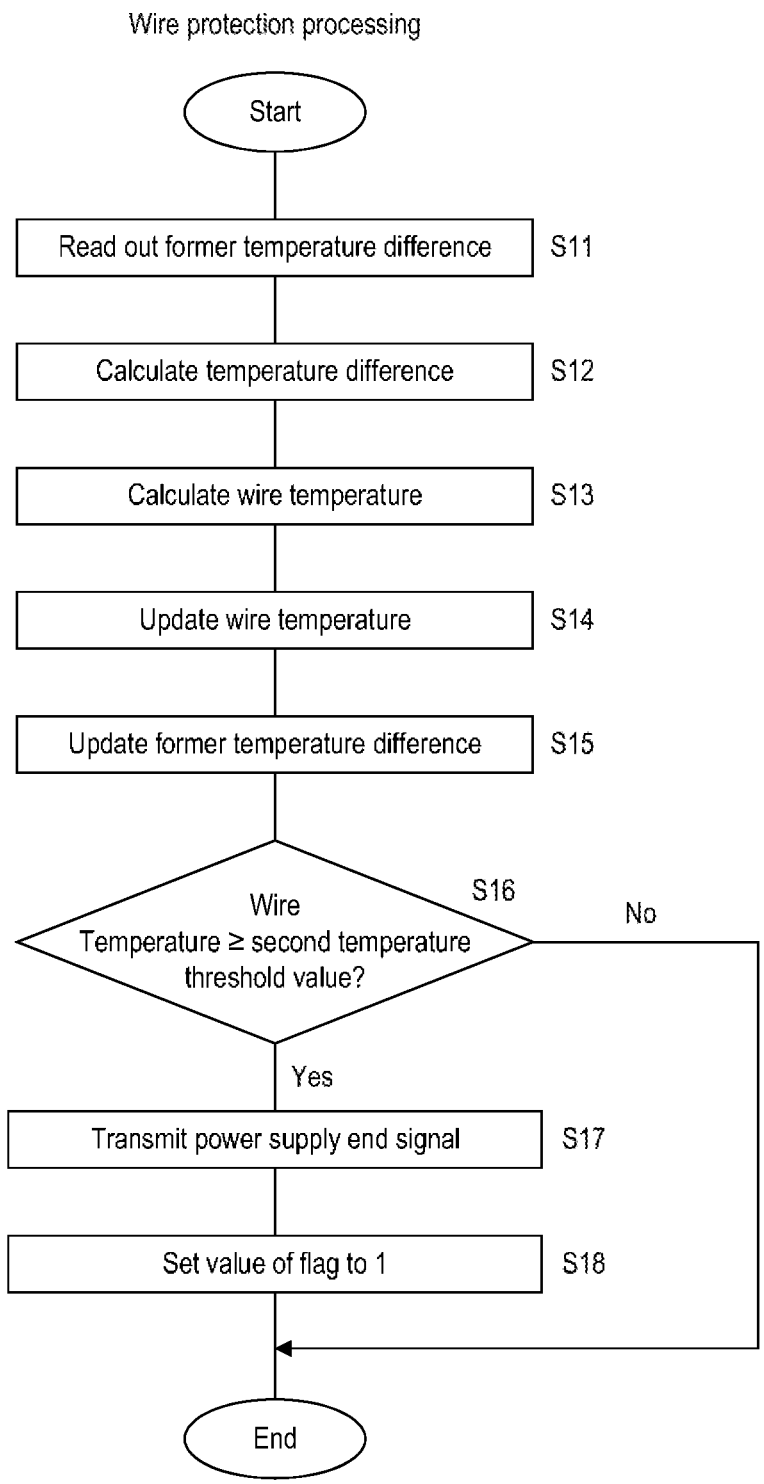
FIG. 7 is a flowchart showing the procedure of wire protection processing.

FIG. 7 is a flowchart showing the procedure of wire protection processing. Here, wire protection processing of the wire W connected to the load 12 whose load ID is "E01" will be described. Wire protection processing of the load 12 corresponding to another load ID is executed similarly to the wire protection processing of the load 12 whose load ID is "E01".

Every time the communication unit 60 receives an information signal that includes current information and temperature information of the wire W connected to the load 12 whose load ID is "E01", the control unit 62 executes the wire protection processing. First, the control unit 62 reads out the former temperature difference corresponding to "E01" from the wire temperature table 71 (step S11).

As will be described later, in the wire protection processing, the control unit 62 calculates the temperature difference between the wire temperature and the environmental temperature in the vehicle C. In the wire temperature table 71, the former temperature difference corresponding to "E01" is a temperature difference calculated in previous wire protection processing corresponding to "E01". When power supply to the microcomputer 30 is started, the control unit 62 updates the former temperature difference in the wire temperature table 71 to zero, assuming that wire temperatures corresponding to all of the loads ID are the same as the environmental temperature. Therefore, after power supply to the microcomputer 30 is started, in the wire protection processing of "E01" that is first executed by the control unit 62, the former temperature difference is zero.

Next, the control unit 62 calculates the temperature difference between the wire temperature and the environmental temperature based on the wire current value and the environmental temperature indicated by the current information and temperature information included in the information signal received by the communication unit 60 and the former temperature difference read out in step S11 (step S12). In step S12, the control unit 62 calculates a temperature difference similarly to the temperature calculation circuit. Therefore, the control unit 62 calculates the temperature difference ΔTw by substituting the wire current value Iw, the environmental temperature Ta, and the former temperature difference ΔTp into Expressions 1 and 2 above.

Note that Δt in Expression 1 that is used in step S12 indicates a period in which the communication circuit 40, not the temperature calculation circuit 55, obtains current information and temperature information.

Next, the control unit 62 calculates a wire temperature by adding, to the temperature difference calculated in step S12, the environmental temperature indicated by the temperature information included in the information signal received by the communication unit 60 (step S13). The control unit 62 also functions as a second temperature calculation unit. Next, in the wire temperature table 71, the control unit 62 updates the wire temperature corresponding to "E01" to the wire temperature calculated in step S13 (step S14).

After executing step S14, the control unit 62 updates the former temperature difference corresponding to "E01" in the wire temperature table 71 to the temperature difference calculated in step S12 (step S15). Next, the control unit 62 determines whether or not the wire temperature corresponding to "E01" in the wire temperature table 71 is higher than or equal to the second temperature threshold value (step S16).

If it is determined that the wire temperature is higher than or equal to the second temperature threshold value (step S16: YES), the control unit 62 instructs the communication unit 60 to transmit a power supply end signal in which the load ID is "E01" to the communication circuit 40 of the sub box 21 connected to the load 12 corresponding to "E01", similarly to step S5 of the power supply control processing (step S17). Accordingly, the drive unit 52 switches off the switch 50, and power supply to the load 12 corresponding to "E01" ends.

Next, the control unit 62 sets the value of the flag corresponding to "E01" to 1 in the wire temperature table 71 (step S18). As described above, when the value of the flag is 1, the switch 50 connected to the load 12 corresponding to "E01" is not switched on in the power supply control processing. Thus, after the value of the flag has been set to 1, the switch 50 connected to the load 12 corresponding to "E01" is kept in the off state.

If it is determined that the wire temperature is lower than the second temperature threshold value (step S16: NO), or after step S18 is executed, the control unit 62 ends the wire protection processing.

Figure 8:
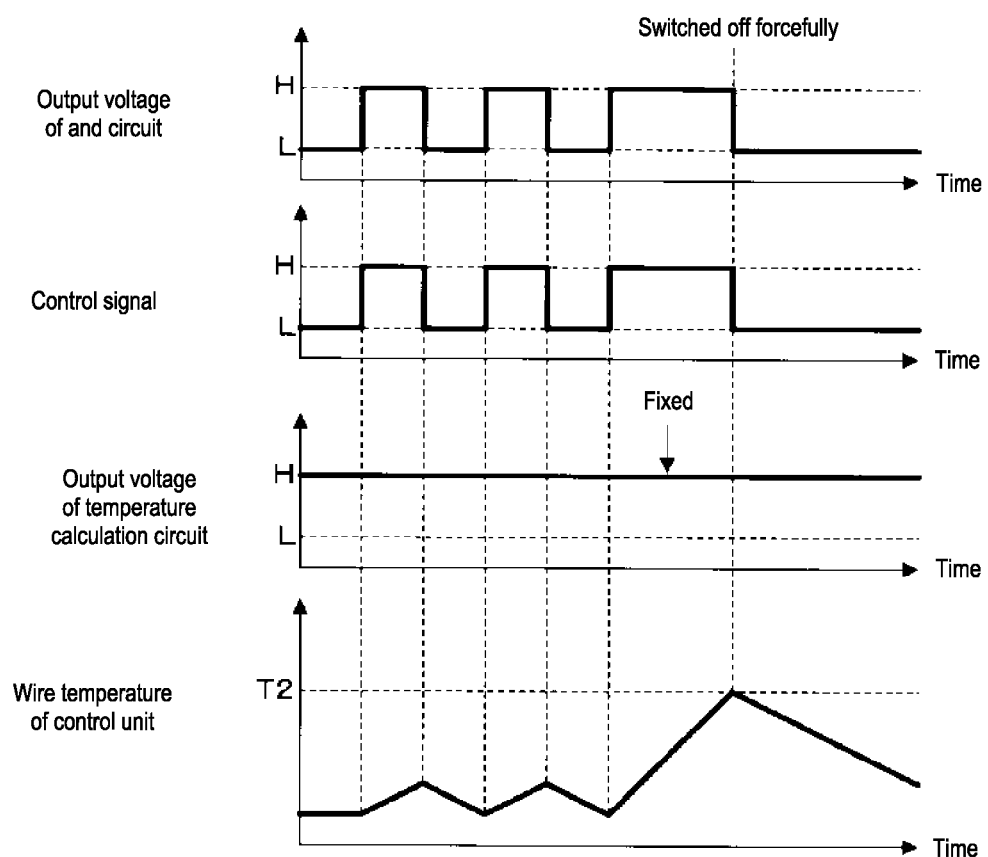
FIG. 8 is a diagram illustrating the effects of wire protection processing.

FIG. 8 is a diagram illustrating the effects of the wire protection processing. FIG. 8 shows an output voltage of the AND circuit 53, a voltage indicated by a control signal, an output voltage of the temperature calculation circuit 55, and a wire temperature calculated by the control unit 62. In these graphs, the horizontal axis indicates time. Also in FIG. 8, similarly to FIG. 3, the high-level voltage and the low-level voltage are respectively indicated by "H" and "L". The second temperature threshold value is indicated by T2.

If the calculated wire temperature is lower than the second temperature threshold value T2, the control unit 62 keeps the value of the flag at zero, and determines whether or not to start power supply to the load 12 corresponding to "E01" in the power supply control processing, and whether or not to end power supply to the load 12 corresponding to "E01". If a determination is made to start power supply, the control unit 62 instructs the communication unit 60 to transmit a power supply start signal in which the load ID is "E01" to the communication circuit 40. If a determination is made to end power supply, the control unit 62 instructs the communication unit 60 to transmit a power supply end signal in which the load ID is "E01" to the communication circuit 40.

The communication circuit 40 outputs, to the AND circuit 53, a control signal indicating the voltage that is based on the signal received from the communication unit 60. Specifically, when the power supply start signal is received, the communication circuit 40 switches the voltage indicated by the control signal to the high-level voltage, and, when the power supply end signal is received, the communication circuit 40 switches the voltage indicated by the control signal to the low-level voltage. As described above, when the temperature calculation circuit 55 in the controller 41 is outputting the high-level voltage, the AND circuit 53 outputs the voltage indicated by the control signal, and the drive unit 52 switches on or off the switch 50 in accordance with the voltage indicated by the control signal.

Assume that the voltage that is output by the temperature calculation circuit 55 is fixed at the high-level voltage due to various causes. In this case, the drive unit 52 switches on or off the switch 50 in accordance with the voltage indicated by the control signal independently of the wire temperature calculated by the temperature calculation circuit 55. The wire W is not protected based on the wire temperature calculated by the temperature calculation circuit 55.

However, when the calculated wire temperature rises to the second temperature threshold value T2 or higher, the control unit 62 sets the value of the flag to 1, and instructs the communication unit 60 to transmit a power supply end signal in which the load ID is "E01" to the communication circuit 40. Accordingly, the communication circuit 40 switches the voltage indicated by the control signal to the low-level voltage independently of a determination result related to power supply to the load 12 corresponding to "E01", and the drive unit 52 forcefully switches off the switch 50.

As described above, after the wire temperature calculated by the control unit 62 rises to the second temperature threshold value T2 or higher, the value of the flag is 1, and thus a power supply start signal in which the load ID is "E01" is not transmitted. As a result, the drive unit 52 keeps the switch 50 in the off state. When the switch 50 is off, no current flows through the wire W, and thus the wire temperature drops with the lapse of time.

As described above, when the wire temperature calculated by the temperature calculation circuit 55 rises to the first temperature threshold value or higher, the output voltage of the temperature calculation circuit 55 is switched to the low-level voltage. Thus, at a timing that is substantially the same as a timing when the voltage indicated by control signal switches to the low-level voltage, the voltage that is output by the temperature calculation circuit 55 also switches to the low-level voltage if the output voltage of the temperature calculation circuit 55 is not fixed at the high-level voltage.

As described above, even if the voltage that is output by the temperature calculation circuit 55 is fixed at the high-level voltage due to an occurrence of a malfunction, when the wire temperature calculated by the control unit 62 rises to the second temperature threshold value T2 or higher, the drive unit 52 switches off the switch 50 independently of the voltage indicated by the control signal. In addition, as described above, even if the voltage indicated by the control signal is fixed at the high-level voltage due to an occurrence of a malfunction, when the wire temperature calculated by the temperature calculation circuit 55 in the controller 41 rises to the first temperature threshold value T1 or higher, the drive unit 52 switches off the switch 50 independently of the voltage indicated by the control signal. Therefore, even if a malfunction occurs, the wire W is protected from an abnormal temperature.

Second Embodiment

Figure 9:
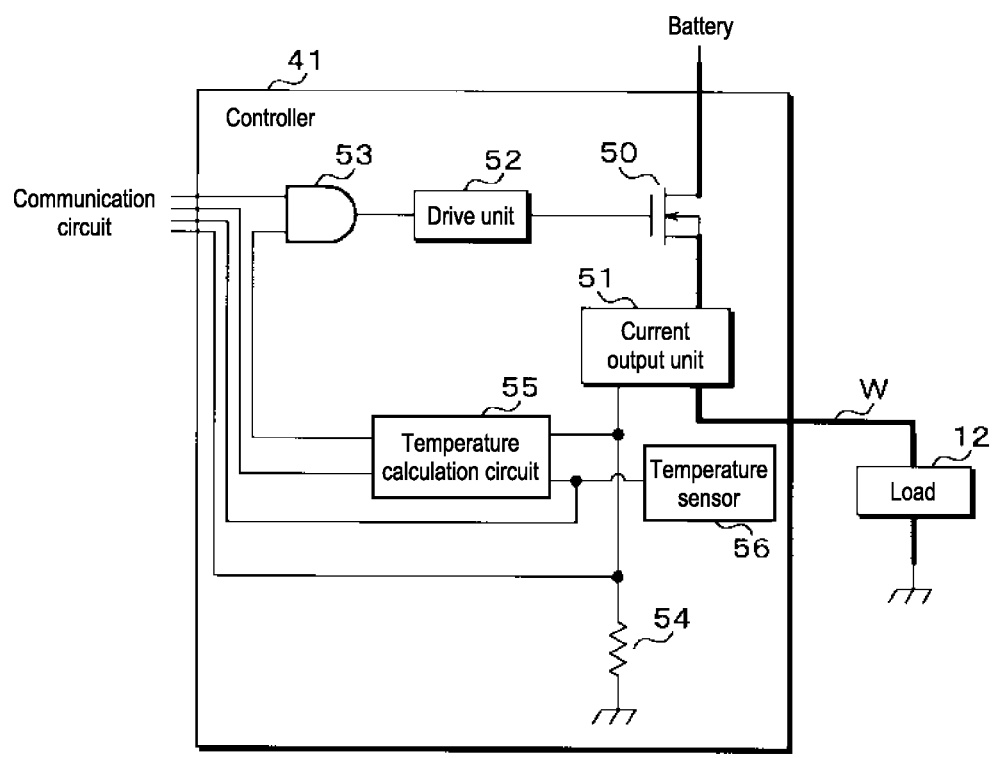
FIG. 9 is a block diagram showing the main constituent elements of a controller according to a second embodiment.

FIG. 9 is a block diagram showing the main constituent elements of a controller 41 according to a second embodiment.

The differences between the first embodiment and the second embodiment will be described below. Constituent elements other than constituent elements to be described later are the same as those in the first embodiment. Therefore, the same reference signs are assigned to the constituent elements that are the same as those in the first embodiment, and a description thereof is omitted.

Also in the second embodiment, the configurations of a plurality of controllers 41 included in the power supply control device 10 are similar. In a controller 41 according to the second embodiment, the temperature calculation circuit 55 is further connected to the communication circuit 40.

The communication circuit 40 obtains a digital temperature difference calculated by the temperature calculation circuit 55, from the temperature calculation circuit 55. In addition, the communication circuit 40 notifies the temperature calculation circuit 55 of the digital temperature difference. When the temperature calculation circuit 55 is notified of the temperature difference by the communication circuit 40, a former temperature difference that is used for calculating a wire temperature is updated to the temperature difference notified from the communication circuit 40.

The communication circuit 40 periodically obtains digital current information, digital temperature information, and a digital temperature difference. Every time current information, temperature information, and a temperature difference are obtained, the communication circuit 40 transmits an information signal that includes the obtained current information, temperature information, and temperature difference, to the communication unit 60 of the microcomputer 30.

The communication unit 60 of the microcomputer 30 transmits a temperature difference signal indicating a temperature difference, in accordance with an instruction from the control unit 62. The temperature difference signal includes a load ID. If the load ID included in the temperature difference signal is "E01", the communication unit 60 transmits the temperature difference signal to the communication circuit 40 corresponding to the load 12 whose load ID is "E01". When the temperature difference signal is received, the communication circuit 40 notifies the temperature calculation circuit 55 of the temperature difference indicated by the temperature difference signal.

Figure 10:
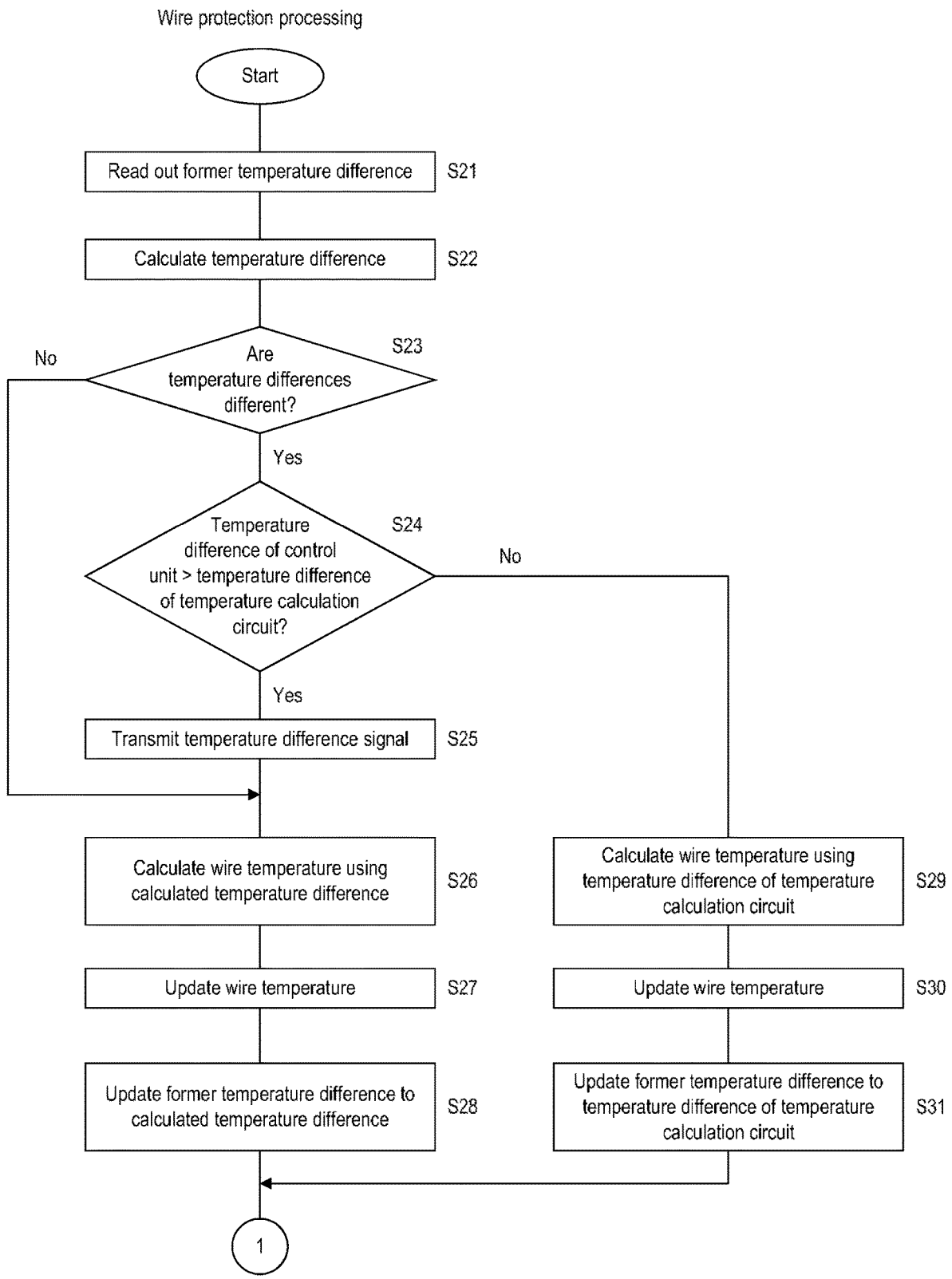
FIG. 10 is a flowchart showing the procedure of wire protection processing.
Figure 11:
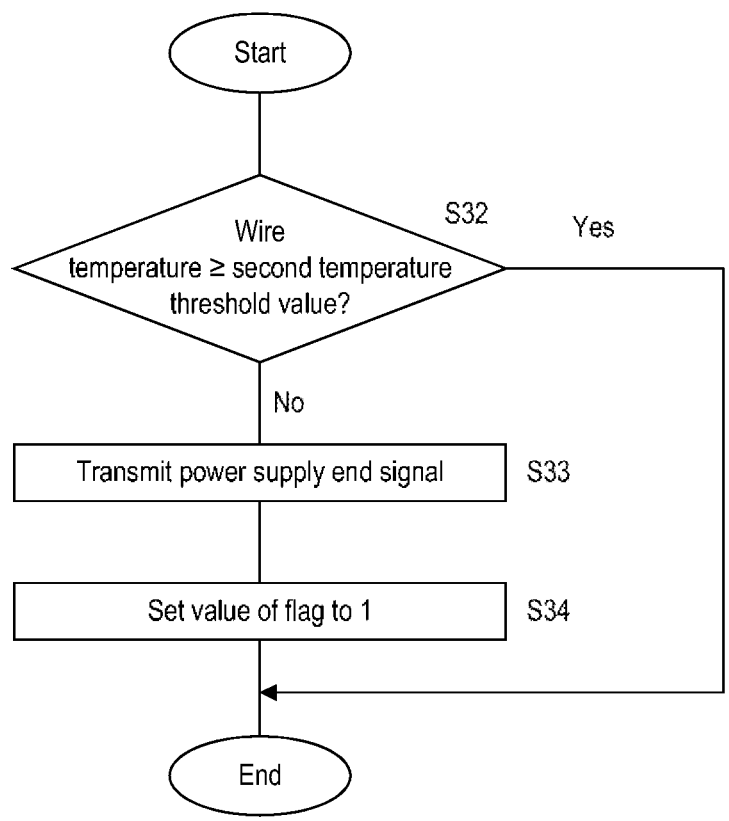
FIG. 11 is a flowchart showing the procedure of wire protection processing.

FIGS. 10 and 11 are flowcharts showing the procedure of wire protection processing. Here, wire protection processing of the wire W connected to the load 12 whose load ID is "E01" will be described. Wire protection processing of the load 12 corresponding to another load ID is executed similarly to the wire protection processing of the load 12 whose load ID is "E01".

Every time the communication unit 60 receives an information signal that includes current information, temperature information, and a temperature difference of the wire W connected to the load 12 whose load ID is "E01", the control unit 62 executes the wire protection processing. Steps S21, S22, and S32 to S34 of the wire protection processing according to the second embodiment are respectively similar to steps S11, S12, and S16 to S18 of the wire protection processing according to the first embodiment. Thus, a detailed description of steps S21, S22, and S32 to S34 is omitted.

In the wire protection processing, after executing step S22, the control unit 62 determines whether or not the temperature difference calculated in step S22 and the temperature difference included in the information signal received by the communication unit 60 are different from each other (step S23). The difference value is an absolute value. The control unit 62 also functions as a temperature difference determination unit. If it is determined that the temperature differences are different from each other (step S23: YES), the control unit 62 determines whether or not the temperature difference of the control unit 62 calculated in step S22 exceeds the temperature difference of the temperature calculation circuit 55 included in the information signal (step S24).

If it is determined that the temperature difference of the control unit 62 exceeds the temperature difference of the temperature calculation circuit 55 (step S24: YES), the control unit 62 instructs the communication unit 60 to transmit the temperature difference signal indicating the temperature difference calculated in step S22 to the communication circuit 40 of the sub box 21 connected to the load 12 corresponding to "E01" (step S25). Accordingly, the communication circuit 40 notifies the temperature calculation circuit 55 corresponding to "E01" of the temperature difference indicated by the temperature difference signal, and the temperature calculation circuit 55 updates the former temperature difference that is used for calculating a wire temperature to the temperature difference notified from the communication circuit 40.

If it is determined that the temperature differences are not different from each other, in other words the temperature differences are the same (step S23: NO), or after step S25 is executed, the control unit 62 calculates a wire temperature using the temperature difference calculated in step S22, similarly to step S13 in the wire protection processing according to the first embodiment (step S26). The environmental temperature that is used in step S26 is an environmental temperature indicated by the temperature information of the information signal received by the communication unit 60.

Next, in the wire temperature table 71, the control unit 62 updates the wire temperature corresponding to "E01" to the wire temperature calculated in step S26 (step S27). Next, the control unit 62 updates the former temperature difference corresponding to "E01" to the temperature difference calculated in step S22 (step S28).

If it is determined that the temperature difference of the control unit 62 does not exceed the temperature difference of the temperature calculation circuit 55 (step S24: NO), the control unit 62 calculates a temperature difference using the temperature difference of the temperature calculation circuit 55, similarly to step S12 of the wire protection processing according to the first embodiment (step S29). The environmental temperature that is used in step S29 is also the environmental temperature indicated by the temperature information of the information signal received by the communication unit 60.

Next, in the wire temperature table 71, the control unit 62 updates the wire temperature corresponding to "E01" to the wire temperature calculated in step S29 (step S30). Next, the control unit 62 updates the former temperature difference corresponding to "E01" to the temperature difference of the temperature calculation circuit 55 included in the information signal (step S31). After executing one of steps S28 and S31, the control unit 62 executes step S32. Processing of step S32 onward is similar to that in the first embodiment.

If the temperature differences calculated by the temperature calculation circuit 55 and the control unit 62 in the power supply control device 10 according to the second embodiment are different from each other, the former temperature differences that are used by the temperature calculation circuit 55 and the control unit 62 are set to the larger temperature difference out of the temperature differences calculated by the temperature calculation circuit 55 and the control unit 62. Thus, the temperature differences calculated by the temperature calculation circuit 55 and the control unit 62 hardly differ.

Therefore, even when a malfunction such as the voltage indicated by the control signal being fixed or a voltage that is output by the temperature calculation circuit 55 being fixed occurs, the switch 50 is switched off at an appropriate timing. Furthermore, since the former temperature differences are set to the larger temperature difference, it is unlikely that the wire temperatures calculated by the temperature calculation circuit 55 and the control unit 62 will be lower than the actual wire temperature.

The power supply control device 10 according to the second embodiment also has effects similar to those of the power supply control device 10 according to the first embodiment.

Note that, according to the second embodiment, a configuration may also be adopted in which, in order to allow a certain degree of error, if the temperature differences calculated by the temperature calculation circuit 55 and the control unit 62 are larger than or equal to a reference value, the former temperature differences that are used by the temperature calculation circuit 55 and the control unit 62 are set to the larger temperature difference out of the temperature differences calculated by the temperature calculation circuit 55 and the control unit 62. The reference value is a fixed value that exceeds zero, and is set in advance. In this case, in step S23 of the wire protection processing, the control unit 62 determines whether or not the difference value between the temperature difference calculated in step S22 and the temperature difference included in the information signal received by the communication unit 60 is larger than or equal to the reference value. If it is determined that the difference value is larger than or equal to the reference value, the control unit 62 executes step S24, and if it is determined that the difference value is lower than the reference value, the control unit 62 executes step S26.

In addition, processing that is performed by the control unit 62 if it is determined that the two temperature differences are different from each other, and processing that is performed by the control unit 62 if it is determined that the difference value between the two temperature differences is larger than or equal to the reference value are not limited to processing for setting the former temperature differences that are used by the temperature calculation circuit 55 by the control unit 62 to the larger temperature difference out of the two temperature differences. For example, a configuration may also be adopted in which, in the wire protection processing, if it is determined that the two temperature differences are different from each other, the control unit 62 executes steps S33 and S34, or if it is determined that the difference value between the two temperature differences is larger than or equal to the reference value, the control unit 62 executes steps S33 and S34. In this case, the voltage indicated by the control signal is fixed at the low-level voltage, and the switch 50 is kept in the off state.

Third Embodiment

According to the second embodiment, the control unit 62 checks two temperature differences calculated by the temperature calculation circuit 55 and the control unit 62. However, the check that is performed by the control unit 62 is not limited to the check for two temperature differences.

The differences between the second embodiment and a third embodiment will be described below. Constituent elements other than constituent elements to be described later are the same as those in the second embodiment. Therefore, the same reference signs are assigned to the constituent elements that are the same as those in the second embodiment, and a description thereof is omitted.

According to the third embodiment, each communication circuit 40 obtains a digital wire temperature calculated by the temperature calculation circuit 55, from the temperature calculation circuit 55. The communication circuit 40 periodically obtains digital current information, digital temperature information, and a digital wire temperature. Every time current information, temperature information, and a wire temperature are obtained, the communication circuit 40 transmits an information signal that includes the obtained current information, temperature information, and wire temperature to the communication unit 60 of the microcomputer 30.

Figure 12:
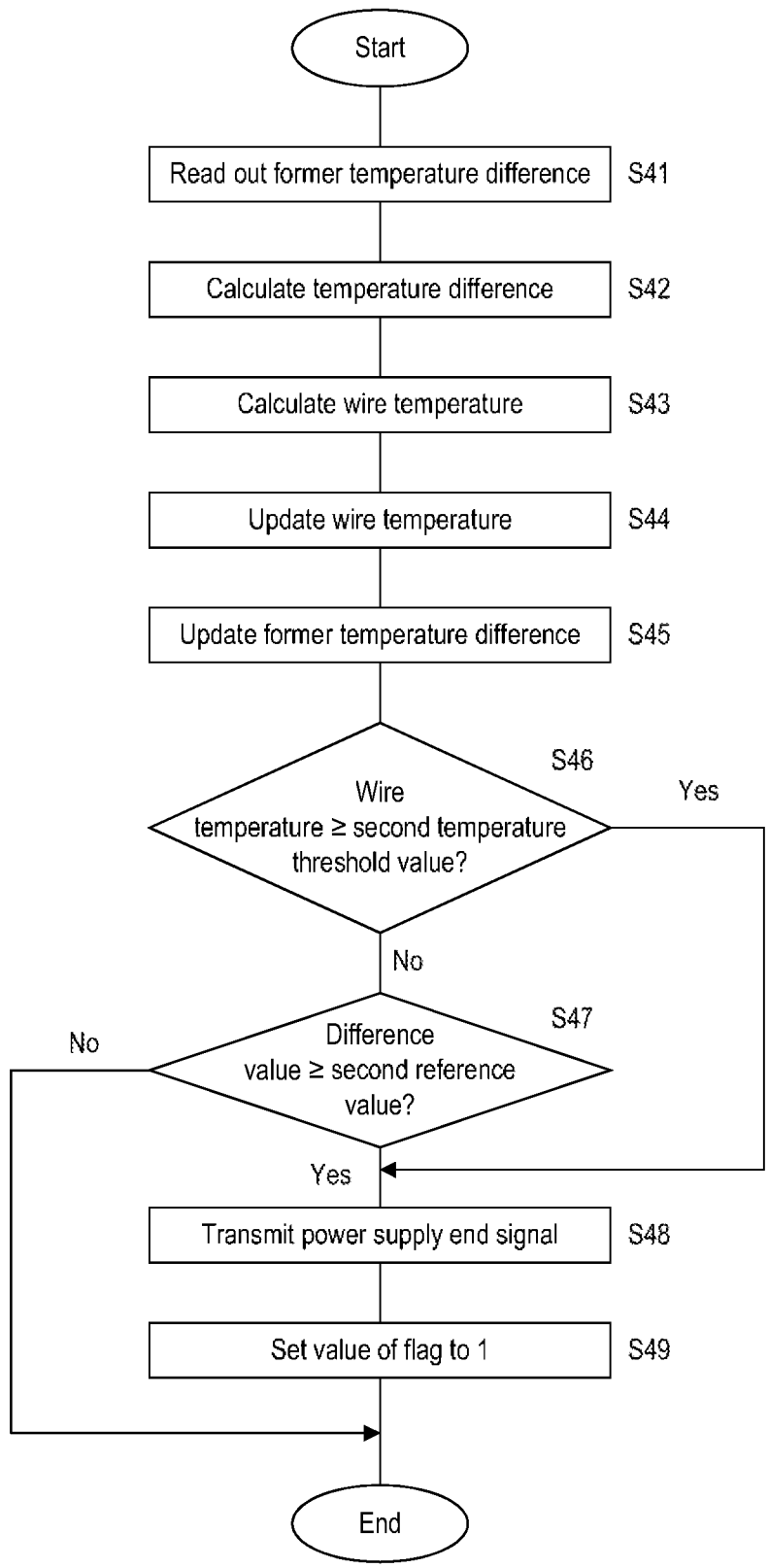
FIG. 12 is a flowchart showing the procedure of wire protection processing according to a third embodiment.

FIG. 12 is a flowchart showing the procedure of wire protection processing according to the third embodiment. Here, wire protection processing of the wire W connected to the load 12 whose load ID is "E01" will be described. Wire protection processing of the load 12 corresponding to another load ID is executed similarly to the wire protection processing of the load 12 whose load ID is "E01".

Every time the communication unit 60 receives an information signal that includes current information, temperature information, and a wire temperature of the wire W connected to the load 12 whose load ID is "E01", the control unit 62 executes the wire protection processing. Steps S41 to S46, S48, and S49 of the wire protection processing according to the third embodiment are similar to steps S11 to S16, S17, and S18 of the wire protection processing according to the first embodiment. Thus, a detailed description of steps S41 to S46, S48, and S49 is omitted.

If it is determined that the wire temperature corresponding to "E01" is lower than the second temperature threshold value (step S46: NO), the control unit 62 determines whether or not the difference value between the wire temperature corresponding to "E01" in the wire temperature table 71 and the wire temperature included in the information signal received by the communication unit 60 is larger than or equal to a second reference value (step S47). The difference value is an absolute value. The second reference value is a fixed value that exceeds zero, and is set in advance. The control unit 62 also functions as a temperature determination unit.

The control unit 62 determines, by executing step S47, whether or not an abnormality has occurred in calculations of a wire temperature that are performed by the temperature calculation circuit 55 and the control unit 62.

If it is determined that the wire temperature corresponding to "E01" is larger than or equal to the second temperature threshold value (step S46: YES), or it is determined that the difference value is larger than or equal to the second reference value (step S47: YES), the control unit 62 sequentially executes steps S48 and S49. If it is determined that the difference value is smaller than the second reference value (step S47: NO), the control unit 62 ends the wire protection processing.

In the wire protection processing according to the third embodiment, not only when the wire temperature rises to the second temperature threshold value or higher, but also when the difference value between two wire temperatures rises to the second reference value or higher, the control unit 62 instructs the communication unit 60 to transmit a power supply end signal in which the load ID is "E01", and sets the value of the flag to 1.

Figure 13:
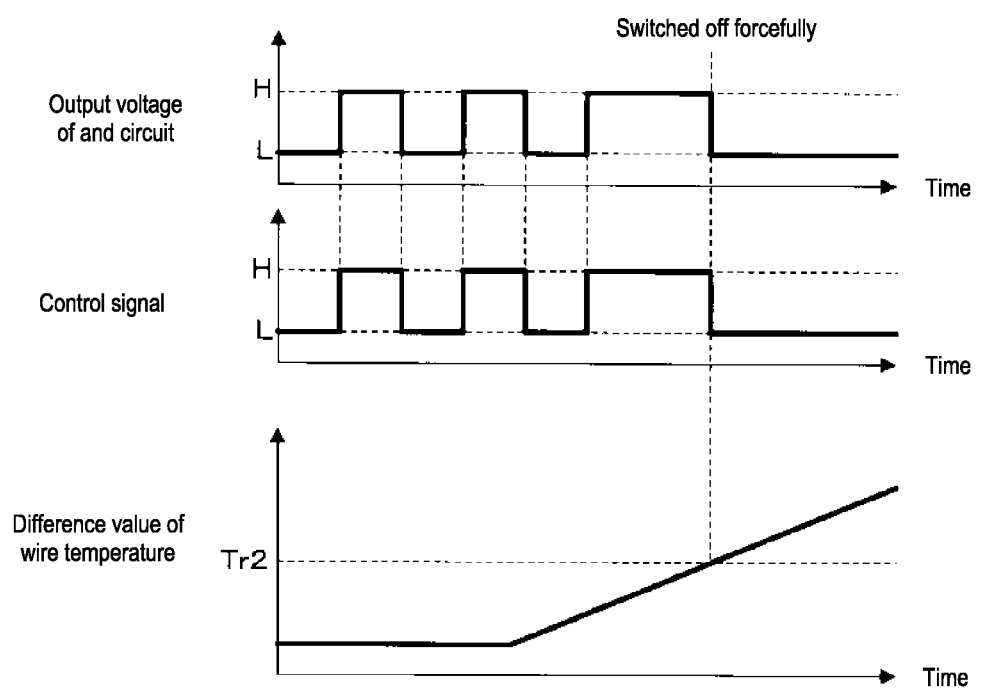
FIG. 13 is a diagram illustrating the effects of wire protection processing.

FIG. 13 is a diagram illustrating the effects of the wire protection processing. FIG. 13 shows an output voltage of the AND circuit 53, a voltage indicated by a control signal, and the difference value between two wire temperatures calculated by the temperature calculation circuit 55 by the control unit 62. In these graphs, the horizontal axis indicates time. Also in FIG. 13, similarly to FIGS. 3 and 8, the high-level voltage and the low-level voltage are indicated by "H" and "L". The second reference value is indicated by Tr2.

As shown in FIG. 13, if the difference value between two wire temperatures is lower than the second reference value Tr2, the AND circuit 53 outputs a voltage indicated by a control signal, to the drive unit 52 as long as the temperature calculation circuit 55 outputs the high-level voltage. The drive unit 52 switches on or off the switch 50 in accordance with the voltage indicated by the control signal.

When the difference value between the two wire temperatures rises to the second reference value Tr2 or higher, the control unit 62 sets the value of the flag to 1, and instructs the communication unit 60 to transmit a power supply end signal in which the load ID is "E01" to the communication circuit 40. Accordingly, the communication circuit 40 switches the voltage indicated by the control signal to the low-level voltage independently of a determination result related to power supply to the load 12 corresponding to "E01", and the drive unit 52 switches off the switch 50.

After the difference value between the two wire temperatures rises to the second reference value Tr2 or higher, the value of the flag is 1, and thus a power supply start signal in which the load ID is "E01" is not transmitted. As a result, the drive unit 52 keeps the switch 50 in the off state.

Assume that, in the power supply control device 10 according to the third embodiment, an abnormality has occurred in calculations of a wire temperature that are performed by the temperature calculation circuit 55 and the control unit 62, in other words the difference value between wire temperatures calculated by the temperature calculation circuit 55 and the control unit 62 rose to the second reference value Tr2 or higher. In this case, there is the possibility the switch 50 cannot be appropriately switched off based on the wire temperature, and thus the drive unit 52 forcefully switches off the switch 50.

Note that, in the first to third embodiments, it suffices for the former temperature differences that are used by the temperature calculation circuit 55 and the control unit 62 to be formerly calculated temperature differences, and thus the former temperature differences are not limited to temperature differences calculated last time, and may also be temperature differences calculated before the temperature differences calculated last time, for example. In the first and third embodiments, a method for calculating a wire temperature that is performed by the temperature calculation circuit 55 may be different from a method for calculating a wire temperature that is performed by the control unit 62. In the first and third embodiments, it suffices for the methods for calculating a wire temperature that are performed by the temperature calculation circuit 55 and the control unit 62 to be a method for calculating a wire temperature based on the wire current value, and thus there is no limitation to a method for calculating a temperature difference between a wire temperature and the environmental temperature in the vehicle C. In addition, in the first to third embodiments, the switch 50 is not limited to an N-channel FET, and may also be a P-channel FET, a bipolar transistor, a relay contact, or the like.

Furthermore, in the first to third embodiments, the number of sub boxes 21 of the power supply control device 10 may also be 1. In addition, the number of loads 12 connected to a sub box 21 may also be 1. Moreover, a configuration may also be adopted in which the power supply control device 10 does not include the main box 20. In this case, the power supply control device 10 includes one or more sub boxes 21, and calculation of a wire temperature that is performed by the control unit 62 of the microcomputer 30 is omitted. The communication circuit 40 of each sub box 21 receives a power supply start signal and a power supply end signal via the communication bus 22. The power supply control device 10 may also be constituted by one sub box 21.

The disclosed first to third embodiments are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. A power supply control device for supplying electrical power to a load, the power supply control device includes a switching unit that switches on or off a switch disposed on a wire connecting the power supply control device to the load, comprising:
    an output unit that outputs a control signal indicating whether the switch is to be on or off; and
    a first temperature calculation unit that calculates a wire temperature of the wire based on a current value of a current flowing through the wire, the first temperature calculation unit interposed between the output unit and the switch,
    wherein, if the wire temperature calculated by the first temperature calculation unit is lower than a temperature threshold value, the switching unit switches on or off the switch in accordance with content indicated by the control signal output by the output unit, and
    if the wire temperature calculated by the first temperature calculation unit is higher than or equal to the temperature threshold value, the switching unit switches off the switch independently of the content indicated by the control signal output by the output unit.

2. The power supply control device according to claim 1, further comprising:
an on-determination unit that determines whether or not to switch on the switch;
an off-determination unit that determines whether or not to switch off the switch; and
a second temperature calculation unit that calculates the wire temperature based on the current value,
wherein, if the wire temperature calculated by the second temperature calculation unit is lower than a second temperature threshold value, the output unit outputs a control signal indicating content that is based on a determination result by the on-determination unit or off-determination unit, and
when the wire temperature calculated by the second temperature calculation unit rises to the second temperature threshold value or higher, the output unit outputs a control signal indicating that the switch is to be off independently of the determination result.

3. The power supply control device according to claim 2, wherein the first temperature calculation unit and the second temperature calculation unit each repeatedly calculate a temperature difference between an environmental temperature in a vehicle and the wire temperature, and
the first temperature calculation unit and the second temperature calculation unit each calculate a first temperature difference based on a formerly calculated temperature difference and the current value, and calculate the wire temperature by adding the environmental temperature to the first temperature difference.

4. The power supply control device according to claim 3, further comprising:
a temperature difference determination unit that determines whether or not two temperature differences calculated by the temperature calculation unit and the second temperature calculation unit are different from each other,
wherein, if the temperature difference determination unit determines that the two temperature differences are different from each other, the temperature calculation unit and second temperature calculation unit use a larger temperature difference out of the two temperature differences as the former temperature difference.

5. The power supply control device according to claim 2, further comprising:
a temperature determination unit that determines whether or not a second difference value between two wire temperatures calculated by the temperature calculation unit and the second temperature calculation unit is larger than or equal to a second predetermined value.

* * * * *